(12) United States Patent
Devenyi

(10) Patent No.: US 6,323,575 B1
(45) Date of Patent: Nov. 27, 2001

(54) HIGH-EFFICIENCY ROTATING COIL TORQUE MOTOR

(75) Inventor: Gabor Devenyi, Penetang (CA)

(73) Assignee: Hughes Electronics, Los Angeles, CA (US)

( * ) Notice: Subject to any disclaimer, the term of this patent is extended or adjusted under 35 U.S.C. 154(b) by 0 days.

(21) Appl. No.: 08/566,208

(22) Filed: Dec. 1, 1995

(51) Int. Cl.[7] ............................. H02K 21/26; G03B 9/08
(52) U.S. Cl. .................. 310/266; 310/154; 310/261; 354/234.1; 354/271.1
(58) Field of Search .................... 310/266, 154, 310/261; 354/234.1, 271.1

(56) References Cited

U.S. PATENT DOCUMENTS

| | | | |
|---|---|---|---|
| 3,602,749 | * | 8/1971 | Esters ................................. 310/154 |
| 4,041,512 | * | 8/1977 | Iwata et al. ......................... 354/234 |
| 4,378,146 | * | 3/1983 | Suzuki et al. ......................... 354/44 |
| 4,460,253 | * | 7/1984 | Kawai et al. ..................... 354/271.1 |
| 5,038,063 | * | 8/1991 | Graber et al. ...................... 310/115 |
| 5,081,388 | * | 1/1992 | Chen ................................... 310/266 |

FOREIGN PATENT DOCUMENTS

338518 * 5/1959 (CH) ................................... 310/266

* cited by examiner

Primary Examiner—Thomas M. Dougherty
Assistant Examiner—B. Mullins
(74) Attorney, Agent, or Firm—Gordon R. Lindeen, III; Michael W. Sales; Wanda K. Denson-Low

(57) ABSTRACT

A torque motor includes an annular, cylindrically symmetric, stationary inner support ring having an outer surface, and a plurality of inner permanent magnets affixed to the outer surface of the inner support ring. The torque motor further includes an annular, cylindrically symmetric, stationary outer support ring overlying the inner support ring and having an inner surface, and a plurality of outer permanent magnets affixed to the inner surface of the outer support ring. There is an annular, cylindrically symmetric, rotationally movable rotor body ring lying between the inner support ring and the outer support ring, wherein the movable rotor body ring has a plurality of openings therethrough. A plurality of electromagnet rotor coils is supported in the openings on the movable rotor body ring. In a preferred form, there are six inner permanent magnets and twelve outer permanent magnets, spaced equidistantly around the circumference of the respective support rings, and six electromagnet rotor coils spaced equidistantly around the circumference of the rotor body ring.

20 Claims, 3 Drawing Sheets

HIGH-EFFICIENCY ROTATING COIL TORQUE MOTOR

BACKGROUND OF THE INVENTION

This invention relates to a torque motor and, more particularly, to a torque motor having an optimized stationary magnetic field.

A mechanical actuator is a device that controllably produces a mechanical movement. The mechanical actuator is typically connected to another device which requires such a movement for its proper operation. Mechanical actuators can be designed to produce linear, rotational, or other types of movements, as required, and the present invention deals with a rotational actuator or torque motor.

One type of torque motor includes a set of electromagnet rotor coils affixed to a stationary annular support ring in a symmetric configuration. A set of corresponding permanent magnets is affixed to a rotationally movable shaft lying within the support ring, with the permanent magnets in a generally facing but angularly displaced relationship to the electromagnet rotor coils. A ferromagnetic stationary flux shield overlies the annular support ring.

This conventional torque motor is operable, but has limitations resulting from its design. The inventor has recognized that the presence of the flux shield reduces the available torque of the motor due to induced magnetic coupling. Moreover, it is difficult to optimize the performance of the torque motor within the weight, response, and space constraints of the torque motor.

There is a need for an improved approach to the design of a torque motor. The present invention fulfills this need, and further provides related advantages.

SUMMARY OF THE INVENTION

The present invention provides a torque motor with improved torque and response characteristics, within the same size envelope as prior torque motors. Alternatively, the torque motor can be built smaller and lighter than conventional torque motors, but with the same torque performance. The torque motor is also more efficient than conventional torque motors, leading to lower heat production in service. The preferred torque motor of the invention achieves substantially linear performance over about ±7.5° (about 15° total) of rotational movement, which is sufficient for many practical applications of interest.

In accordance with the invention, a torque motor comprises an annular, cylindrically symmetric, stationary inner support ring, and at least two inner permanent magnets affixed to the inner support ring. There is further an annular, cylindrically symmetric, stationary outer support ring overlying the inner support ring, and at least two outer permanent magnets affixed to the outer support ring. The torque motor has an annular, cylindrically symmetric, rotationally movable rotor body lying between the inner support ring and the outer support ring, and at least one electromagnet rotor coil affixed to the movable rotor body ring.

In a preferred embodiment, a torque motor comprises an annular, cylindrically symmetric, stationary inner support ring having an outer surface, and a plurality of inner permanent magnets affixed to the outer surface of the inner support ring. There is an annular, cylindrically symmetric, stationary outer support ring overlying the inner support ring and having an inner surface, and a plurality of outer permanent magnets affixed to the inner surface of the outer support ring. The torque motor further includes an annular, cylindrically symmetric, rotationally movable rotor body ring lying between the inner support ring and the outer support ring. The movable rotor body ring has a plurality of openings therethrough, and a plurality of electromagnet rotor coils affixed in the openings on the movable rotor body ring. There are preferably six corresponding inner permanent magnets, twelve outer permanent magnets, and six electromagnet rotor coils set in generally facing, but angularly offset positions, each arranged in a pattern of six-fold symmetry on their respective support rings.

The torque motor of the invention achieves a flux focusing effect through the facing relation of the inner and outer permanent magnets. The electromagnet rotor coils on the movable rotor body ring consequently react with a higher magnetic field than would otherwise be the case, resulting in a higher torque output of the motor without an increase in the envelope size of the torque motor.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
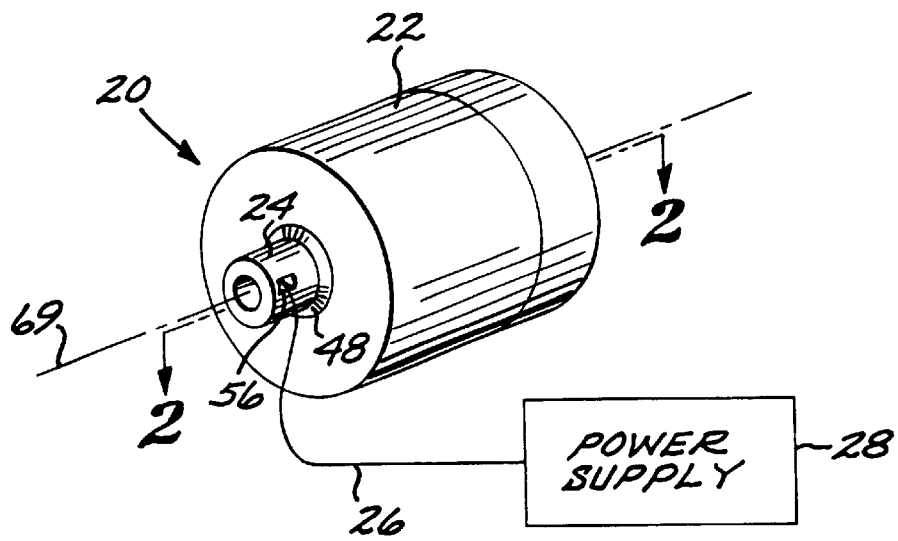
FIG. 1 is a perspective view of a torque motor according to the invention.

FIG. 1 depicts a torque motor 20. The torque motor 20 includes a stationary body 22 and a hollow, rotating shaft 24 extending therefrom. A pair of leads 26 for electromagnets extend from the rotating shaft 24 to a power supply 28.

Figure 2:
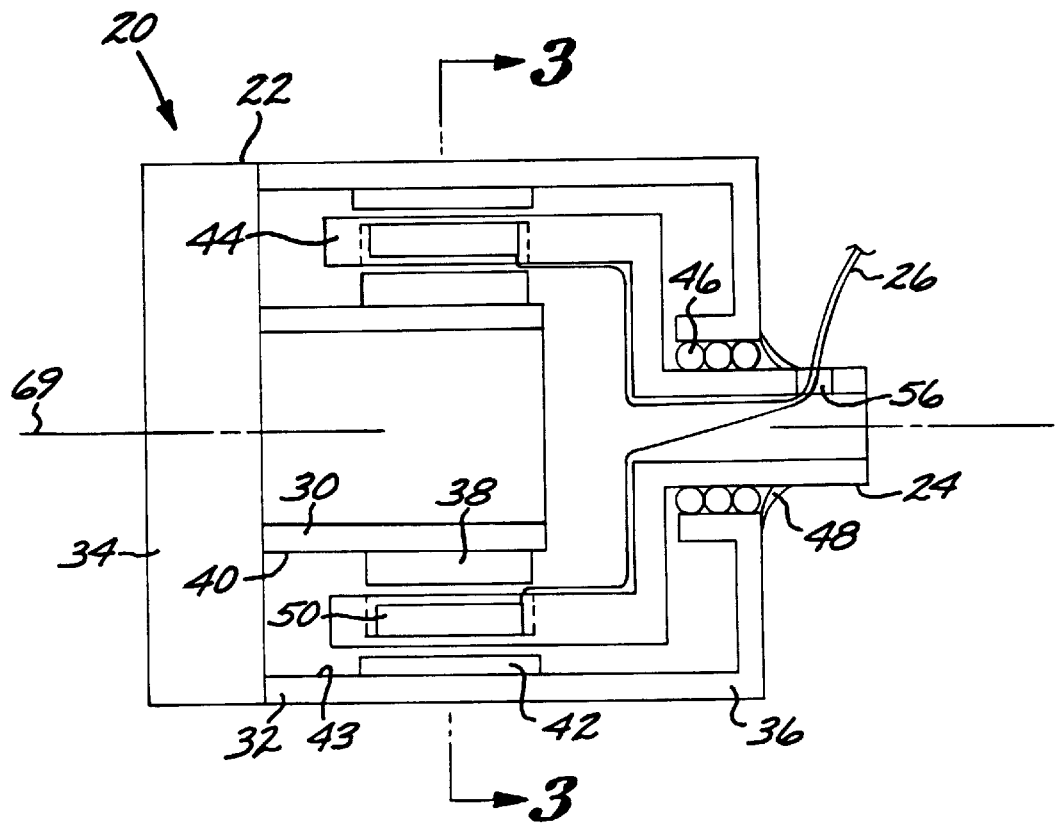
FIG. 2 is a schematic sectional view, taken generally along lines 2—2 of FIG. 1, of the torque motor.

FIG. 2 is a sectional view of the torque motor 20. The body 22 of the torque motor 20 includes a stationary inner support ring 30 and a stationary outer support ring 32. The support rings 30 and 32 are each in the form of a cylindrically symmetric annulus, fixed to a common base 34. The inner annular diameter of the outer support ring 32 is larger than the outer annular diameter of the inner support ring 30. The support rings 30 and 32 are each made of a ferromagnetic material, such as iron or steel. As shown in FIG. 2, the inner support ring 30 serves as an internal flux shield and magnetic field return path. The outer support ring 32 serves as an external flux shield and magnetic shield return path. The outer support ring 32 also serves as an external housing 36 for the torque motor, or there may be a separate external housing with the outer support ring 32 fixed to the interior wall of the external housing.

At least two, and preferably six, inner permanent magnets 38 are affixed to an outer surface 40 of the inner support ring 30. In one embodiment, at least two, and preferably twelve, outer permanent magnets 42 are affixed to an inner surface 43 of the outer support ring 32. The inner permanent magnets 38 and the outer permanent magnets 42 are therefore in a generally facing relationship, but are angularly offset from each other in a manner to be discussed subsequently. The inner permanent magnets 38 and the outer permanent magnets 42 are generally thin and are preferably curved to conform to the shape of the surfaces upon which they are respectively affixed.

In another, but less preferred, embodiment, the outer permanent magnets 42 are omitted. The outer support ring 32 functions only as a flux shield. This design has improved performance as compared with a conventional torque motor, but its performance is not as good as the preferred embodiment where outer permanent magnets 42 are used. The alternative embodiment without outer permanent magnets 42 is, however, less costly.

An annular, cylindrically symmetric, rotationally movable rotor body ring 44 lies in the gap between the inner support ring 30 and the outer support ring 32. The rotor body ring 44 is affixed to the hollow shaft 24, which extends from the stationary body 22. The rotor body ring 44 and the shaft 24 are made of a nonmagnetic material, such as aluminum alloy or reinforced plastic. The shaft 24 is rotationally supported on a set of bearings 46. Optionally, a seal 48 such as a rubber sliding seal can be provided between the stationary body 22 (i.e., the outer support ring 32) and the shaft 24 to exclude contaminants, dirt, and corrosive agents from the interior of the motor 20.

Figure 4:
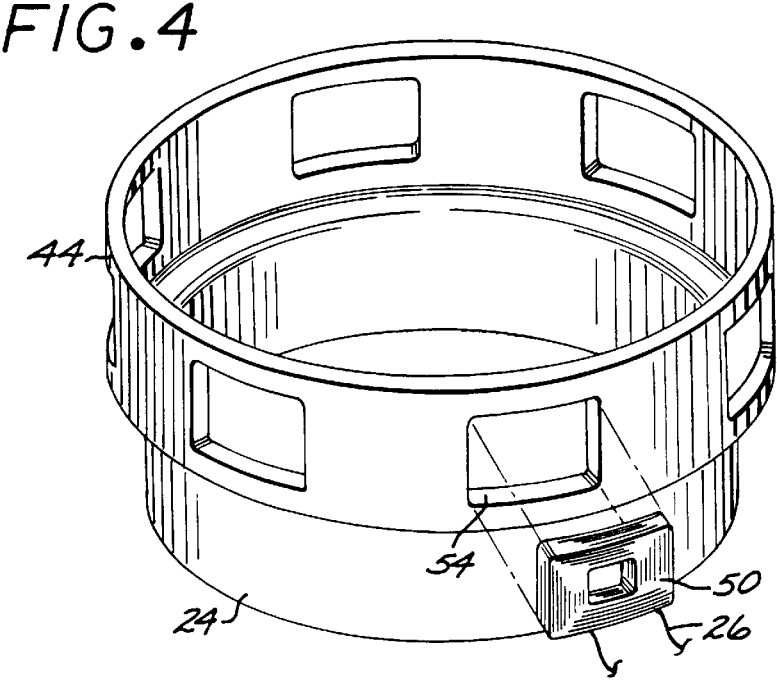
FIG. 4 is a perspective exploded view of a movable rotor body ring used in the torque motor of FIG. 1.

At least one, and preferably six, electromagnets 50 are supported on the rotor body ring 44. FIG. 4 depicts a rotor assembly of the rotor body ring 44, the shaft 24, and one of the six electromagnets 50. The rotor body ring 44 has a window 54 therethrough for each of the electromagnets 50, of the size and shape of the electromagnet 50. The electromagnet 50 is formed as a coil of several turns and layers, of the same thickness as the thickness of the rotor body ring 44. The electromagnet 50 is generally flat, but slightly curved to match the curvature of the rotor body ring 44. The electromagnet 50 is received into the window 54, and bonded to the rotor body ring 44 with an adhesive or other fastening technique. As shown in FIGS. 2 and 4, the leads 26 from the electromagnet 50 extend along the inside of the rotor body ring and through the interior of the shaft 24. The leads 26 pass out of the shaft through a slot 56 therein, and to the power supply 28. This preferred arrangement is used in a torque motor where the entire range of motion is about ±7.5° (15° total). If a larger range of motion is required, the leads 26 can be externally coupled with a sliding ring coupler or other known connector permitting a larger range of rotational motion in the electrical coupling.

Figure 3:
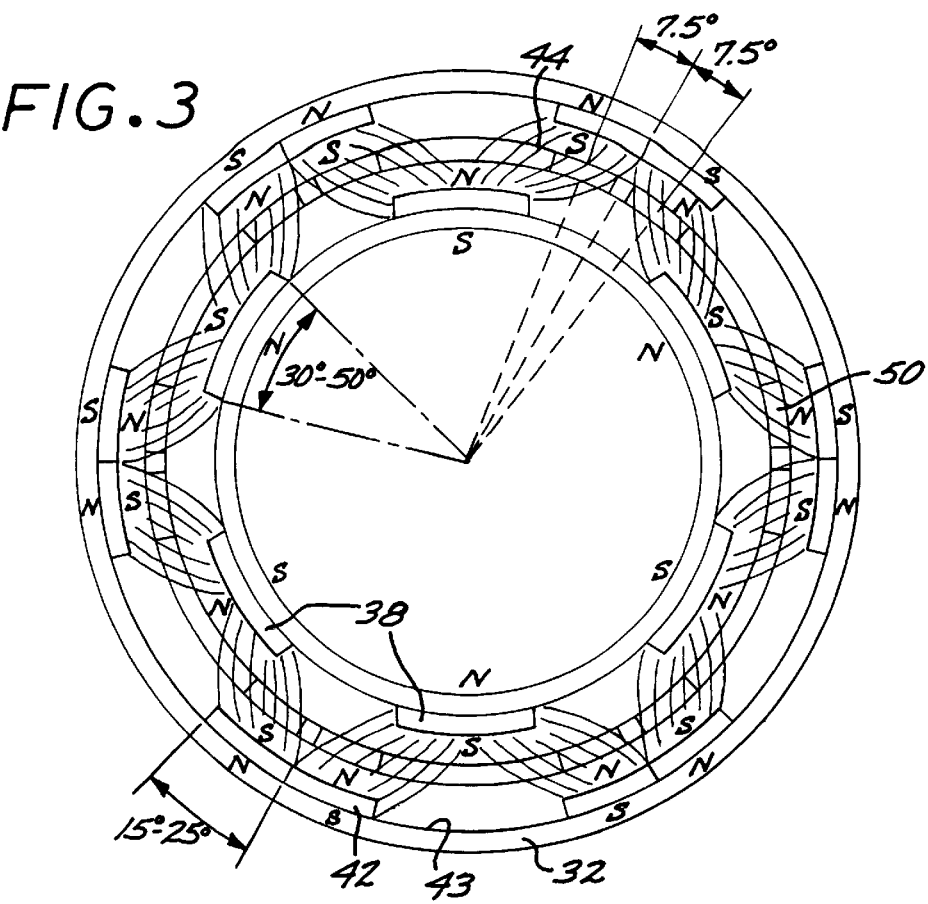
FIG. 3 is a schematic sectional view, taken generally along lines 3—3 of FIG. 2, of the torque motor of FIG. 1.

FIG. 3 is a schematic section through the torque motor, illustrating the relation of the rings, rotor assembly and magnets for the preferred case of six inner permanent magnets 38, twelve outer permanent magnets 42, and six electromagnets 50. Magnetic field lines of force are also shown. The six inner permanent magnets 38, the twelve outer permanent magnets 42, and the six electromagnets 50 are arranged in a sixfold-symmetrical fashion on their respective supports. The six inner permanent magnets 38 include three externally facing N (north)-polarized magnets and three externally facing, oppositely polarized S (south)-polarized magnets, arranged alternatingly around the circumference of the inner support ring 30. Each of the inner permanent magnets 38 subtends an arc of about 30–50°.

The twelve outer permanent magnets 42 are arranged in pairs, with one member of each pair having an inwardly facing N polarization and the other member of each pair having an inwardly facing S polarization. The N–S pairs of outer permanent magnets 42 are arranged so that the N-pole of one magnet of a pair is adjacent to the S-pole of the adjacent pair of outer permanent magnets 42, around the circumference of the outer support ring 32. Each of the outer permanent magnets 42 subtends an arc of about 15–25°. The two outer permanent magnets 42 of each pair can be in abutting contact with each other, as shown, or can be spaced apart as much as about 25°. The spacing between the two outer permanent magnets 42 of each pair may be varied to adjust the angular range of linearity of the torque motor 20.

The outer permanent magnets 42 are arranged so that a radius drawn to the center of each outer permanent magnet 42 coincides with a radius drawn to a location approximately equidistant between two adjacent inner permanent magnets 38. The outer permanent magnets 42 are arranged so that the S-pole of the outer permanent magnet 42 lies in a generally facing, but slightly angularly displaced, relation to one of the N-pole inner permanent magnets 38, and so that the N-pole of the outer permanent magnet 42 lies in a generally facing, but slightly angularly displaced, relation to one of the S-pole inner permanent magnets 38.

In this fashion, as illustrated in FIG. 3, strong, concentrated magnetic lines of force extend between each opposing N-pole inner permanent magnet 38 and the S-pole of one of the outer permanent magnets 42, and strong, concentrated magnetic lines of force extend between each opposing S-pole inner permanent magnet 38 and the N-pole of one of the outer permanent magnets 42 The flux density produced by the permanent magnets is significantly greater than that produced by a single permanent magnet, in a conventional approach to a torque motor. When energized, the poles of the electromagnet 50 intersected by these magnetic lines of force are strongly driven in a rotational direction. The direction of rotation is determined by the polarization of the electric field applied to the electromagnets 50 by the power supply 28. It has been determined that the reaction of the rotor assembly 52 is substantially linear over an angular rotation of about ±7.5° (15° total) for this preferred configuration of six symmetric magnet sets.

Figure 5:
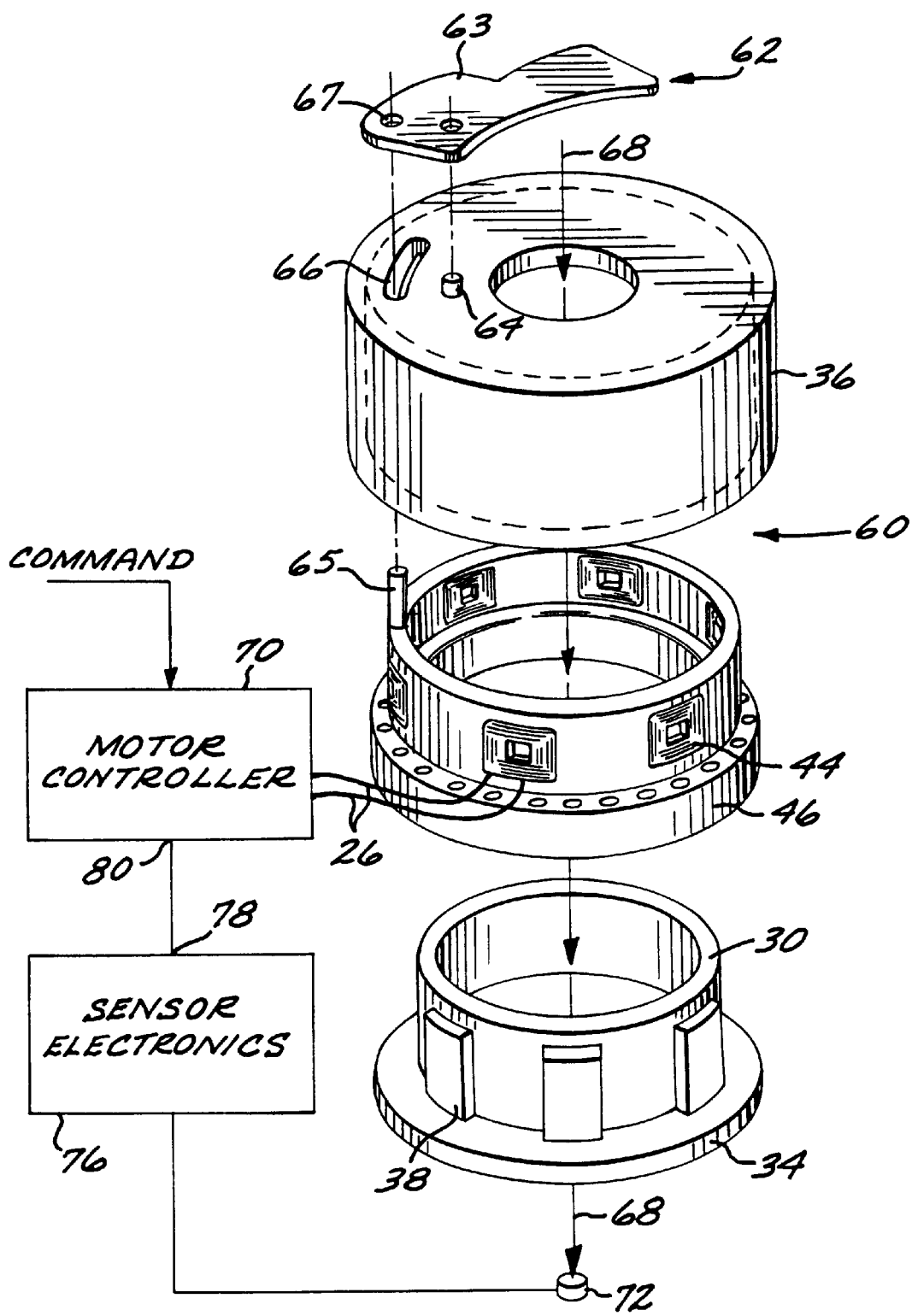
FIG. 5 is a schematic perspective exploded view of an optical iris system activated by the torque motor of FIG. 1.

FIG. 5 illustrates a control system 60 by which the torque motor 20 is used to drive a device, in this case a controllable optical iris 62. The iris 62 is of conventional design, including a number (typically five, but only one shown for clarity) of iris leaves 63, each of which is rotationally supported on a fixed pivot pin 64 extending axially from the housing 36 (which also serves as the outer support ring). Driver pins 65 extend axially from the rotor body ring 44 and pass through slots 66 in the housing 36. The driver pins 65 engage driver pin bores 67 in the iris leaves 63. As the rotor body ring 44 rotates relative to the housing 36, the iris leaves 63 are pivotably opened or closed by a selected amount, depending upon the direction and magnitude of rotation. A beam of light 68, which is to be attenuated by the opening or closing of the iris leaves 63, is coincident with a cylindrical axis 69 of the torque motor 20. In this embodiment, the bearings 46 extend directly between the rotor body ring 44 and the outer housing 36 (which in this case is part of or is joined to the barrel of an optical assembly which incorporates the iris 62).

A motor controller 70 includes a power supply (28) that provides a driving signal to the torque motor 20 through the leads 26 as described previously, and an input channel. A constant or controllable intensity feedback control is illustrated by way of example of the types of apparatus configurations possible in the control system 60. A light sensor 72 is placed so as to measure the total intensity of the light beam 68 passing through the iris 62. The output signal of the light sensor 72 is provided to sensor electronics 76, which produces a control signal output 78 that is responsive to the signal produced by the light sensor 72. The control signal output 78 is provided to the motor controller 70 as a control signal input 80, thereby completing a feedback loop by which the iris leaves 63 are moved so as to vary the total amount of light passing through the iris 62 in a controllable fashion dictated by a Command signal provided to the motor controller 70. For example, the Command signal could command the motor controller 70 to maintain a constant light intensity at the light sensor 72, or to vary that light intensity in some selected fashion.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A torque motor comprising:
   an annular stationary outer ring, the ring having an inner surface;
   at least two outer permanent magnet pairs affixed to the outer ring inner surface, the pairs being located equidistantly about the inner surface, each pair having two adjacent inward facing oppositely polarized magnetic poles;
   an annular stationary inner ring within the outer ring having an outer surface spaced apart from, facing and concentric with the outer ring inner surface;
   at least two inner permanent magnets each having an outward facing pole, the poles being located so that radial lines drawn through the midpoints between the adjacent poles of each outer permanent magnet pair meet the inner ring outer surface substantially equidistant between the outward facing poles of the inner permanent magnets;
   an annular rotationally movable rotor lying between the inner ring and the support ring; and
   at least one electromagnet rotor coil affixed to the rotor.

2. The motor of claim 1 wherein the at least one rotor coil comprises a plurality of rotor coils spaced equidistantly about the circumference of the rotor.

3. The motor of claim 1 wherein the rotor is made of a nonmagnetic material.

4. The motor of claim 1 wherein the adjacent poles of each pair are in abutting contact with one another.

5. The motor of claim 1 wherein the outer permanent magnet pairs are positioned so that the poles of one pair have the same polarity as the adjacent poles of adjacent pairs.

6. The motor of claim 5 wherein the inner permanent magnets are positioned so that the outward facing poles are oppositely polarized from the nearest inward facing poles of the outer permanent magnet pairs.

7. The motor of claim 1 wherein the inner permanent magnets are positioned so that the outward facing poles are oppositely polarized from the adjacent outward facing poles of adjacent inner permanent magnets.

8. The motor of claim 1 wherein the at least two outer permanent magnet pairs comprise six outer permanent magnet pairs and the at least two inner permanent magnets comprise six inner permanent magnet and wherein each of the six inner permanent magnets subtend an arc on the inner ring outer surface from about 30 degrees to about 50 degrees.

9. The motor of claim 8 wherein the at least one rotor coil comprises six rotor coils spaced equidistantly around the circumference of the rotor.

10. The motor of claim 1 wherein the outer ring is adapted to act as a flux shield.

11. The motor of claim 1 wherein the inner ring is adapted to act as a flux shield.

12. The motor of claim 1 wherein the inner ring is made of a ferromagnetic material.

13. The motor of claim 1 wherein the outer ring is made of a ferromagnetic material.

14. The motor of claim 1 wherein the rotor comprises an annular ring with at least one opening and the at least one rotor coil is affixed in the opening.

15. An iris control system comprising:
    an iris having leaves that are alternately opened and closed by rotary motion;
    an annular stationary outer ring, the ring having an inner surface;
    at least two outer permanent magnet pairs affixed to the outer ring inner surface, the pairs being located equidistantly about the inner surface, each pair having two adjacent inward facing oppositely polarized magnetic poles;
    an annular stationary inner ring within the outer ring having an outer surface spaced apart from, facing and concentric with the outer ring inner surface;
    at least two inner permanent magnets each having an outward facing pole, the poles being located so that radial lines drawn through the midpoints between the adjacent poles of each outer permanent magnet pair meet the inner ring outer surface substantially equidistant between the outward facing poles of the inner permanent magnets;
    an annular rotationally movable rotor lying between the inner ring and the support ring;
    at least one electromagnet rotor coil affixed to the rotor; and
    a mechanical linkage between the rotor and the iris leaves so that rotary motion of the rotor alternately opens and closes the iris leaves.

16. The system of claim 15 wherein the mechanical linkage comprises driver pins affixed to the rotor, wherein the iris leaves each comprise a pivot point and a bore and wherein the bores in the iris leaves receive the driver pins so that rotation of the rotor drives the iris leaves about the pivot point.

17. The system of claim 15 further including a feedback controller comprising:
    a radiation sensor disposed to sense radiation passing through the iris and produce an output responsive to the amplitude of the radiation;
    electrical leads coupled to the rotor coil; and
    a motor controller for receiving the radiation sensor output and controlling current supplied to the electrical leads in response thereto.

18. The motor of claim 15 wherein the outer permanent magnet pairs are positioned so that the poles of one pair have the same polarity as the adjacent poles of adjacent pairs.

19. The motor of claim 18 wherein the inner permanent magnets are positioned so that the outward facing poles are oppositely polarized from the nearest inward facing poles of the outer permanent magnet pairs.

20. The motor of claim 15 wherein the inner permanent magnets are positioned so that the outward facing poles are oppositely polarized from the adjacent outward facing poles of adjacent inner permanent magnets.

* * * * *